United States Patent Office 3,544,129
Patented Dec. 1, 1970

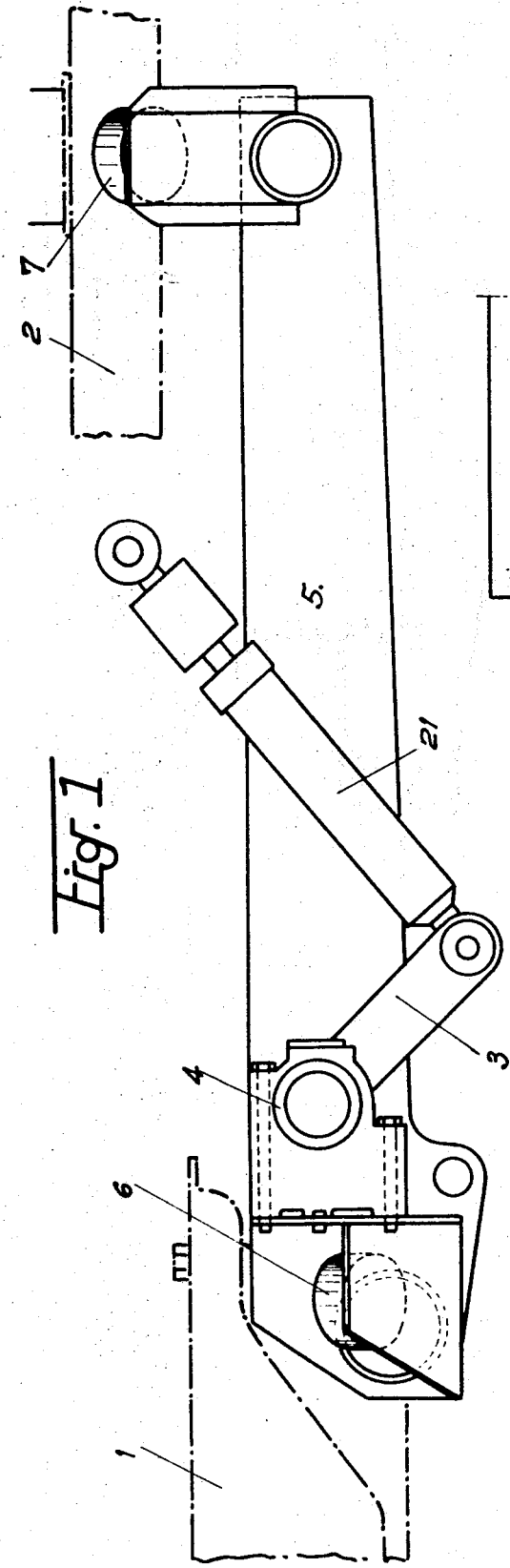
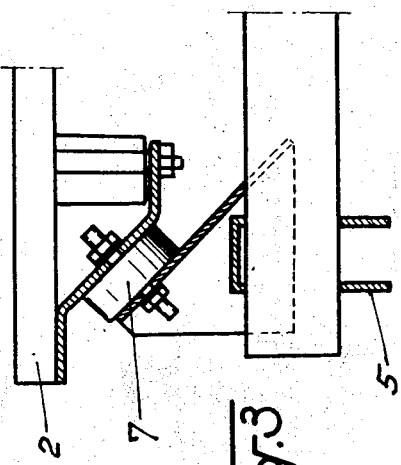
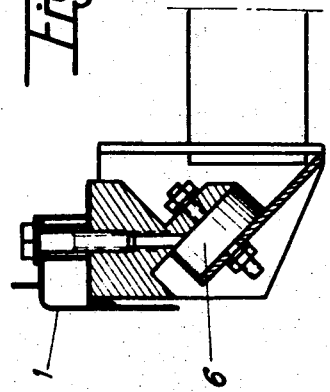

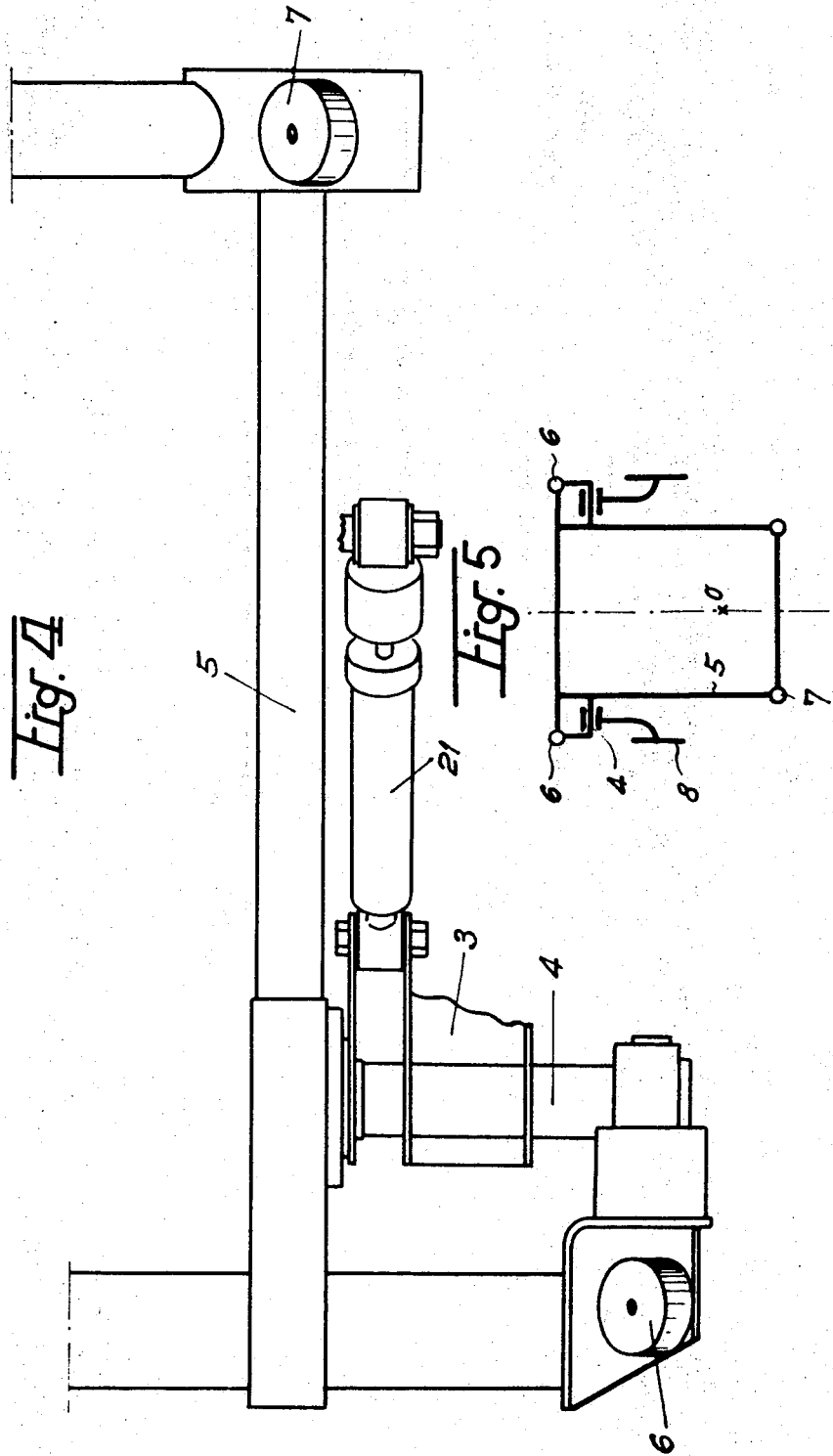

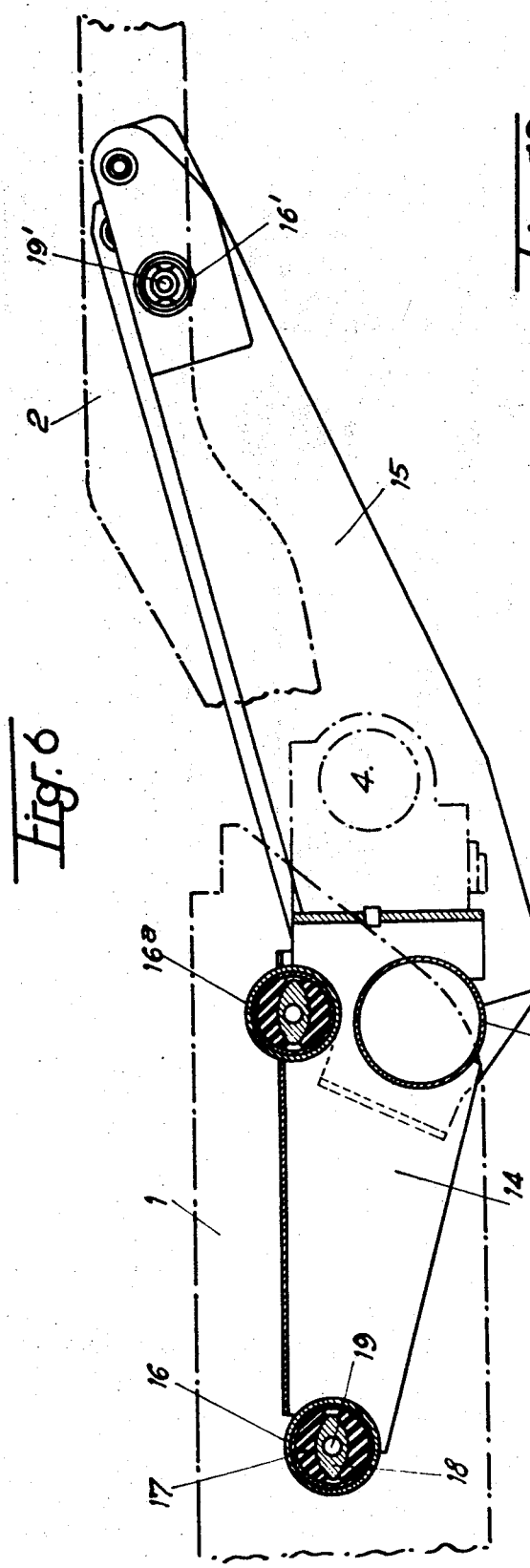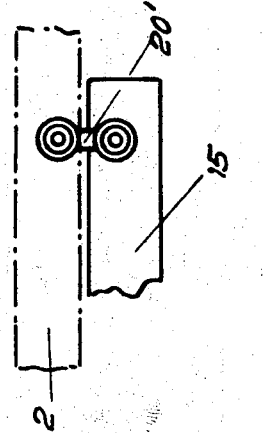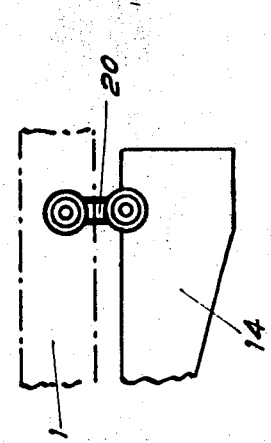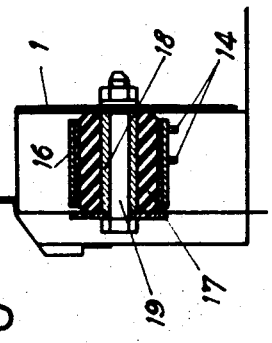

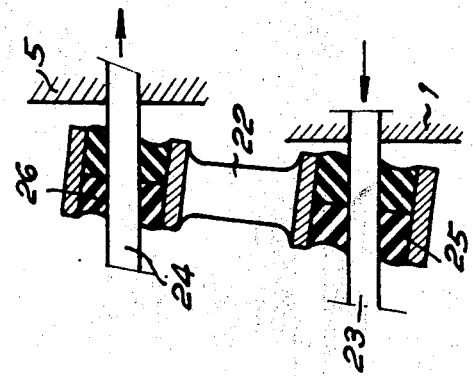
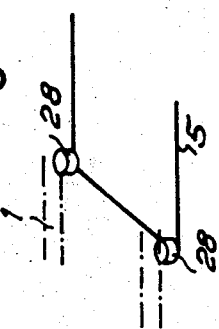
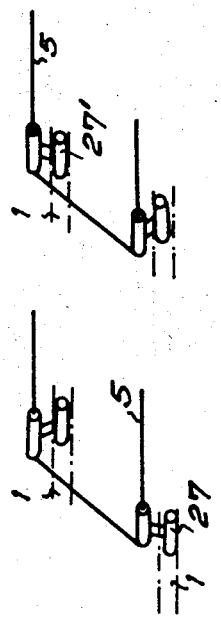
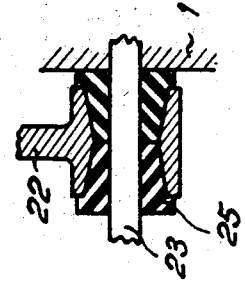
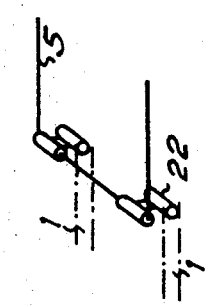
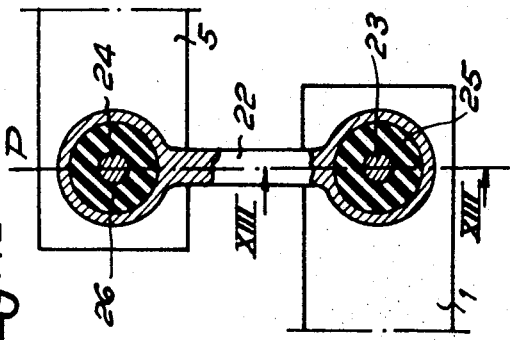

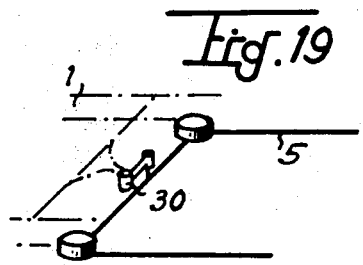
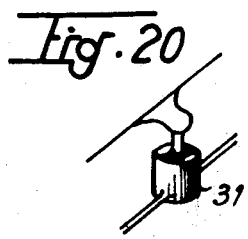
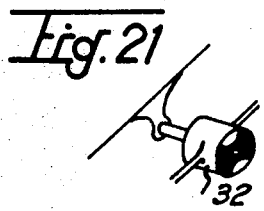
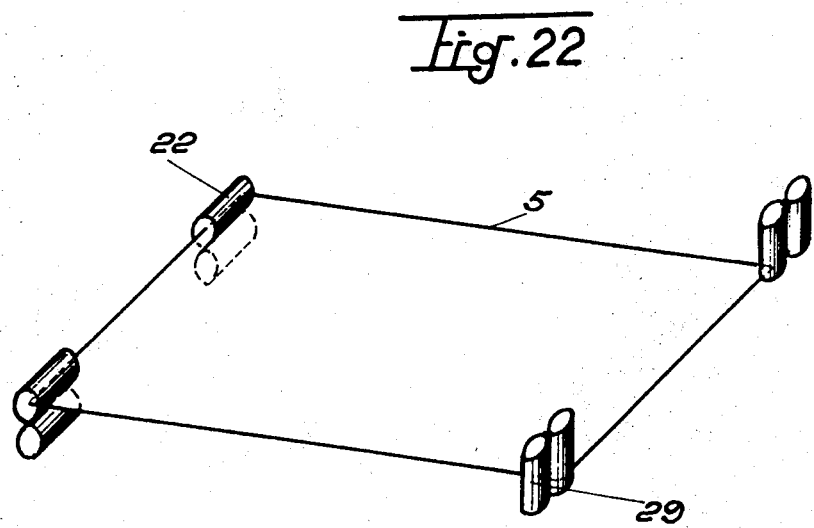
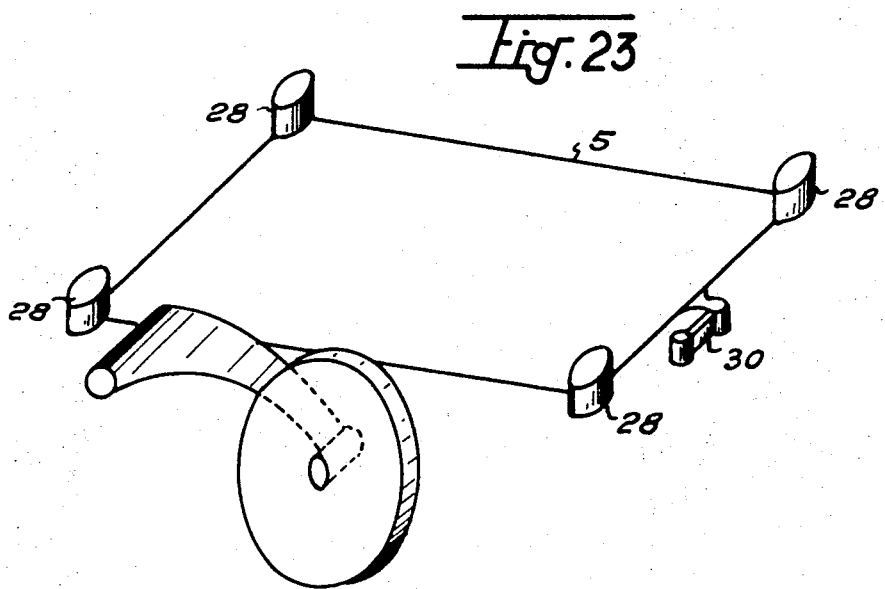

3,544,129
AUTOMOBILE VEHICLES
Edmond Henry-Biabaud, Paris, France, assignor to Societe Anonyme Andre Citroen, Paris, France, a French company
Filed Oct. 26, 1967, Ser. No. 678,402
Claims priority, application France, Nov. 3, 1966, 82,353; Sept. 7, 1967, 3,398
Int. Cl. B60g 11/00
U.S. Cl. 280—106.5　　　　　　　　　　2 Claims

ABSTRACT OF THE DISCLOSURE

An automobile having at least one axle assembly which is intended substantially to prevent transmission of road vibrations to bodywork of the vehicle. The axle assembly includes resilient bushings or other members which are capable of yielding to a greater extent when a given force is applied longitudinally of the vehicle, than when the same force is applied vertically or transversely.

---

The present invention relates to automobile vehicles and has for its object improvements relating to the mounting of axles of these vehicles for the purpose of ensuring the filtering out of vibrations transmitted by these axles to the passenger compartment and the elimination of corresponding noise as well as an improvement in road holding.

According to the present invention there is provided in an automobile vehicle including a chassis, and axles, the improvement comprising means for connecting at least one of said axles to the chassis, and capable of allowing for a given force, a relatively larger displacement when the force is applied longitudinally of the vehicle than when the force is applied in another direction.

Owing to the invention, the axle may be subject to principally longitudinal displacements with respect to the chassis, the plane of rolling remaining practically parallel to the longitudinal axis of the vehicle or even, if it is desired, undergo a change in direction in the sense desired in order to impart to the vehicle an over-steering or under-steering characteristic.

In the case where the vehicle includes two axles, only one of these axles or even two may be connected in accordance with the invention to a chassis.

Preferably, the rolling members, the suspension members and even the damping members are secured to a support member itself constituted, for example, by a frame and connected to the chassis as indicated hereinbefore.

In a first embodiment in accordance with the invention, the frame is connected to the chassis by elastic or resilient supports provided at the two sides of the frame and placed one at the front of this frame and the other to the rear thereof, these supports having a shearing plane parallel to the longitudinal axis of the vehicle.

Preferably, the respective shearing planes of the elastic or resilient supports arranged at the front of the frame are symmetrically inclined with respect to the longitudinal vertical median plane of the vehicle, in such a manner as to form, in a transverse plane, a V which may be directed upwardly or downwardly, the elastic or resilient supports disposed to the rear of the frame being mounted in a similar manner; the two V's thus formed may be orientated in the same sense or in opposite senses, according as to whether it is desired to promote the roll of the bodywork of the vehicle or to oppose it.

In a second embodiment in accordance with the invention, the connection of the axle to the chassis is effected by means of a front and rear system of transverse levers which carry the axle and are connected to the chassis either by a dependent or pendular transversely rigid connection, or by support blocks of an elastomer material arranged, in a manner known in itself, to act principally in shear in the case of longitudinal displacement and principally in compression in the case of vertical or transverse displacements.

In a third embodiment, the frame is connected to the chassis by means of short links resiliently pivoted on the frame and on the chassis.

In a modification, the connection between the frame and the chassis is effected by elastic or resilient blocks with horizontal bearing faces.

There are described hereafter by way of nonlimiting example, various embodiments for mounting a rear axle of an automobile vehicle with reference to the accompanying drawings, in which:

FIG. 1 is a view in elevation of a frame carrying an axle and connected to the chassis by elastic or resilient supports having an inclined shearing plane;

FIGS. 2 and 3 are views in transverse section of a detail showing the connection of the frame to the chassis;

FIG. 4 is a plan view;

FIG. 5 is a diagrammatic view of the frame and of its supports;

FIG. 6 is a view in elevation of one embodiment in which the axle is connected to the chassis by means of a transverse member carrying levers;

FIG. 7 is a transverse section showing the connection on the chassis of the levers in front of the transverse member;

FIG. 9 is an elevational view of a detail of a modification;

FIG. 10 is a plan view of a detail of another modification;

FIG. 11 shows another embodiment of the connection of one end of the frame to the chassis;

FIG. 12 is a longitudinal sectional view of a short connecting link;

FIG. 13 is a transverse sectional view along the line XIII—XIII of FIG. 12;

FIG. 14 shows a section of a short link of which each bush, operating under compression and in shear, constitutes a conical pivot;

FIGS. 15 to 21 show other connecting methods of one end of the frame to the chassis;

FIGS. 22 to 25 show various elastic or resilient mountings of the frame on the chassis.

Figure 8:
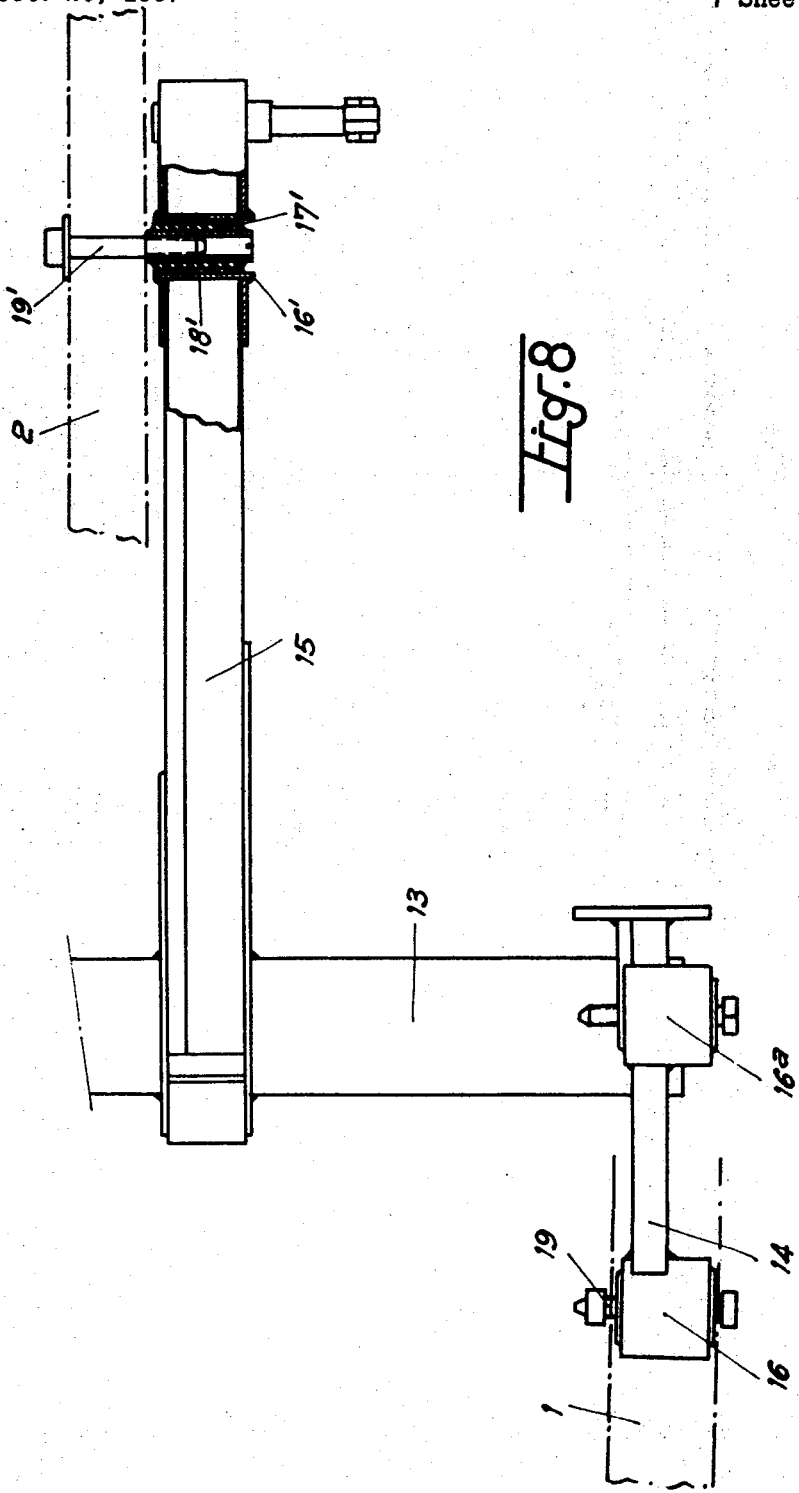
FIG. 8 is a plan view corresponding to FIG. 6.

In FIGS. 1 to 4, the two principal longitudinal members of the chassis of an automobile vehicle are shown at 1. Two auxiliary longitudinally members 2 are disposed to the rear of the longitudinal members 1.

Each of the arms 3 is connected by a pivot 4 to a frame 5. One of the ends of this frame is furthermore, connected to each of the longitudinal members 1 by a rubber bearer 6 of which the longitudinal median plane is parallel to the longitudinal axis of the vehicle and inclined about 45° with respect to the vertical, this inclination being directed to the left for one of the bearers and to the right for the other bearer.

The end of the frame 5 opposite to the longitudinal members 1 is for its part connected to the auxiliary longitudinal members 2 by rubber bearers 7 which are disposed like the bearers 6, their longitudinal median plane being parallel to the longitudinal axis of the vehicle and inclined by about 45° in relation to the vertical.

The longitudinal forces imposed upon the arms 3 cause the bearers 6 and 7 to operate purely in shear at constant volume whilst transverse and vertical forces cause them simultaneously to work in shear and in compression. Now the modulus of elasticity in compression of rubber is about three times larger than the modulus of elasticity in shear. It follows that, for an equal force, the relative displacement of the arm of the axle and of the chassis is larger when this force is acting longitudinally.

Preferably, the bearers 6 are so formed that they undergo, for an equal value of the force, a transverse displacement larger than that of the bearers 7. Under these conditions, when the vehicle turns, the force which is exerted on the rear wheels 8, tends to cause the frame 5 to pivot in the direction of the curvature, which gives rise to an automatic stability of the vehicle. The same result can be obtained by arranging identical bearers lying at an angle, with respect to the vertical, larger for the bearers 6 than for the bearers 7.

In the embodiment of FIGS. 6 to 8, the connection between the arms 3 and the chassis is effected by a transverse member 13 rigid with two front levers 14 and two rear levers 15, the latter being closer to one another than the front levers.

Each of the levers 14 moves forward within the hollow body of one of the longitudinal members 1 and is rigid, at its end, with a socket or other tubular member 16. Rubber blocks 17, in the form of crescent-shaped members, are interposed between the socket and a member of lenticular section 18 which is secured by a bolt 19 to the longitudinal member 1; the member 18 is disposed in such a manner that the principal axis of the lenticular section is substantially parallel to the longitudinal axis of the vehicle. The lever 14 carries, moreover, substantially immediately above the transverse member 13, another socket or tubular member 16a which is secured to the longitudinal member 1 as is the socket 16.

Moreover, each of the rear levers 15 is secured to the corresponding auxiliary longitudinal member 2 by a device similar to those providing the connection of the levers 14 and of the longitudinal members 1 and comprising a socket or other tubular member 16′ welded to the lever. blocks of rubber 17′ in the form of crescents and an internal member 18′, which may be or may be not of lenticular section, is secured by a bolt 19′ to the longitudinal member 2 (FIG. 8).

The pivots 4 of the arms 3 of the axle are carried by the levers 15 and the damping members (shock absorbers) are also connected to these levers.

As in the embodiment of FIGS. 1 to 4, a force exerted on the arm of the axle gives rise to a displacement of this arm of the axle with respect to the chassis which is larger when this force is longitudinal than when it is transverse or vertical. The embodiment of FIGS. 6 to 8 illustrates, moreover, the advantage of the absence of the need for reinforcement of the structure of the chassis beyond the axle, which would be required in order to accommodate the forces transmitted by the external supports 7.

In a modification, the connection device of the bearer joints such as 16 (or 16a) 17, 18, 19, may be replaced by a short link 20 of which the axis of symmetry is substantially vertical and which is pivoted to the lever 14 and to the corresponding longitudinal member 1 (FIG. 9). Similarly, the resilient or elastic connection device 16′, 17′, 18′, 19′ may be replaced by a short link 20′ of which the axis of symmetry is transverse and horizontal and which is pivoted to the lever 15 and to the corresponding longitudinal member 2 (FIG. 10).

In the embodiments which have just been described, the shock absorbers or other damping devices 21 are secured on the one hand on an arm of the wheel or on a lever of which the movement is a function of the clearance of the wheel, and on the other hand either on the frame, or on the body-work, in such a manner as to apportion the filtering-out of the vibrations and the freedom for relative displacements between the axle support and the bodywork of the vehicle.

In FIG. 11, one end of the frame 5 is connected to the main longitudinal members 1 of the chassis through the intermediary of short links 22 of which the substantially vertical plane P (FIG. 12) contains the two pivot axes. These short links are pivoted in a resilient manner on the frame 5 and on the longitudinal members 1; their pivot axes are horizontal and disposed transversely with respect to the vehicle. As can be seen more particularly in FIGS. 12 and 13, each of the short links 22 is connected by a pin 23 to the corresponding longitudinal member 1, and by a pin 24 to the frame 5, with the interposition of resilient bushes 25 and 26 respectively. These bushes may be, as in the embodiment of FIG. 13 constituted by two frusto-conical parts.

The frame can be displaced longitudinally with respect to the chassis. The vertical loads are absorbed by the bushes 25 and 26 operating in compression, whilst the transverse forces are absorbed by the same bushes operating in compression and in shear by acting as conical pivots, as shown in FIG. 14.

In the embodiment of FIG. 15, one end of the frame 5 is connected to the longitudinal members 1 by short links 27 of which the planes P are symmetrically inclined with respect to the vertical and converge upwardly. These short links are resiliently pivoted on the frame and on the longitudinal members and their pivotal axes are horizontal and disposed longitudinally with respect to the vehicle.

With this mounting, the vertical loads and the transverse forces are absorbed by the bushes operating under compression. The longitudinal forces are absorbed by the same bushes working simultaneously in compression and in shear by acting as conical pivots, as shown in FIG. 14.

The embodiment of FIG. 16 is very close to that of FIG. 15, but the planes P of the short links 27′ converge this time downwardly.

In FIG. 17, one end of the frame 5 is connected to the longitudinal members 1 by short links 29 of which the plane P is vertical and disposed transversely with respect to the vehicle; these short links are resiliently pivoted on the frame 5, and on the longitudinal members 1, and their pivot axes are vertical. The frame 5 can be freely displaced longitudinally with respect to the chassis for small amplitudes. In compensation, the transverse forces are absorbed by resilient bushes operating in compression, whilst the vertical loads are absorbed by the same bushes operating in compression and in shear by acting as conical articulations as indicated in FIG. 14.

In the embodiment of FIG. 18, one end of the frame 5 is connected to the longitudinal members 1 by resilient blocks 28 with bearing faces horizontal. Under the action of vertical loads, the blocks 28 operate in compression whilst they operate in shear under the action of longitudinal and transverse forces.

In certain connection devices described hereinbefore, it may be desired to limit the transverse displacements. One solution consists thus in adding an element providing a transverse reaction, such as a short link 30 (FIG. 19) pivotally resiliently secured to the frame and to the chasis and of which the pivotal axes are vertical. In place of this short link, it is possible to use resilient blocks of low transverse flexibility and high longitudinal flexibility, as the cellular cylindrical blocks 31 and 32 shown in FIGS. 20 and 21.

Each of the connection methods hereinbefore described can be utilized equally well at the front as at the rear of each frame. However, for the rear axle considered in the description, it is desirable, in order to provide a vehicle having an understeering tendency which is generally desired, to adopt a combination such that a transverse force gives rise to a displacement of the frame 5 which is larger at its front part than at its rear part. Thus, the systems of connection by short links 29 or with transverse reaction elements, such as 30, 31 and 32, are excluded for the front and always acceptable at the rear of the frame 5, since their elastic members, operating under compression, allow only a small transverse deflection. FIGS. 22 and 23 show examples where such methods of connection at the rear are associated with connection methods at the front of which the transverse deflection is larger because of the operation in shear of their resilient members (short links 22 in FIG. 22 and blocks 28 in FIG. 23).

In the case of FIG. 23, the reaction element 30 provides the predominance of transverse holding at the rear of the frame, the connection elements (28 in the example considered) being identical at the front and at the rear of the frame.

Figure 24:
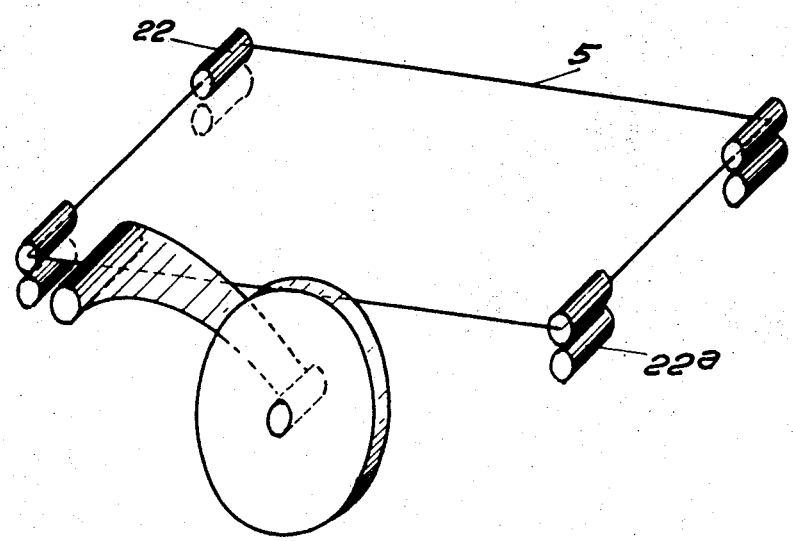

It is possible likewise to avoid the use of a transverse reaction element and to use at the front and rear of the same frame connection elements (FIG 24), but of characteristics which are possibly different (short links 22 at the front, 22a at the rear).

Figure 25:
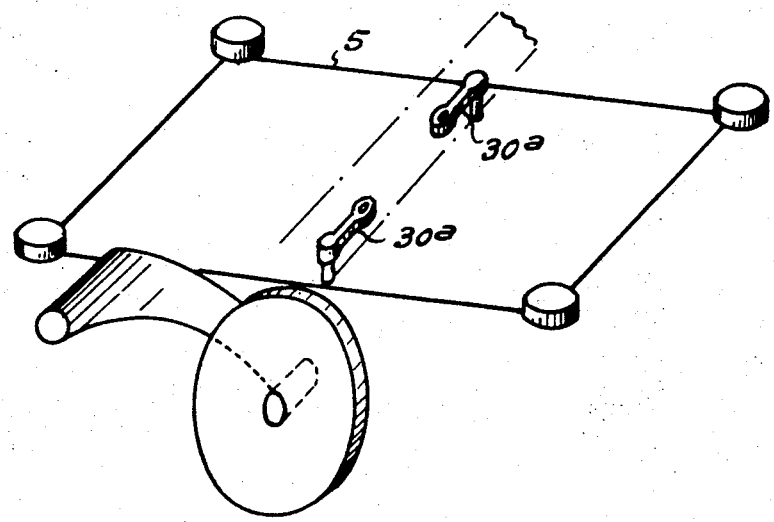

If the absence of an understeering or oversteering characteristic is desired, it is necessary to avoid the turning of the frame with respect to the chassis under the action of transverse forces, for example by employing transverse reaction elements, such as the short links 30a in FIG. 25, adjacent to the vertical plane containing the axes of the wheel.

I claim:

1. An automobile vehicle comprising means interconnecting mounting means for at least one pair of road wheels thereof with the chassis of the vehicle, said interconnecting means including a support frame on which the mounting means is located and which extends forwardly and rearwardly of the axis of the wheels, and at least four resilient connecting members interposed between said support frame and the chassis of the vehicle of which interconnecting members, two are disposed forwardly of the axis of said wheels and two are disposed rearwardly of said axis, said resilient connecting members having shear planes parallel to the longitudinal axis of the vehicle, the respective shear planes of the resilient connecting members being disposed laterally of the frame and being inclined symmetrically with respect to the longitudinal vertical median plane of the vehicle, and form in a transverse plane a V, the orientation of the V being the same for the rearward resilient connecting members as for the forward resilient connecting members, said resilient connecting members being capable of allowing for a given force a displacement of the support frame with respect to the chassis of the vehicle, which is larger when the given force is directed longitudinally of the vehicle than when the force has any other direction.

2. An automobile vehicle comprising means interconnecting mounting means for at least one pair of road wheels thereof with the chassis of the vehicle, said interconnecting means including a support frame on which the mounting means is located and which extends forwardly and rearwardly of the axis of the wheels, and at least four resilient connecting members interposed between said support frame and the chassis of the vehicle of which interconnecting members, two are disposed forwardly of the axis of said wheels and two are disposed rearwardly of said axis, said resilient connecting members having shear planes parallel to the longitudinal axis of the vehicle, the respective shear planes of the resilient connecting members being disposed laterally of the frame and being inclined symmetrically with respect to the longitudinal vertical median plane of the vehicle and form in a transverse plane, a V, the orientation of the V being different for the rearward resilient connecting members than for the forward resilient connecting members, said resilient connecting members being capable of allowing for a given force a displacement of the support frame with respect to the chassis of the vehicle, which is larger when the given force is directed longitudinally of the vehicle than when the force has any other direction.

References Cited

UNITED STATES PATENTS

| 2,782,026 | 2/1957 | Hirst | 267—63 |
| 2,751,992 | 6/1956 | Nallinger | 280—106.5 X |
| 2,888,269 | 5/1959 | Hogsten | 280—106.5 |
| 3,201,142 | 8/1965 | Dangauthier | 280—106.5 |
| 3,395,769 | 8/1968 | Julien | 280—106.5 X |

PHILIP GOODMAN, Primary Examiner

U.S. Cl. X.R.

280—124